(12) United States Patent
Dey et al.

(10) Patent No.: US 12,524,088 B2
(45) Date of Patent: Jan. 13, 2026

(54) COMPUTER SYSTEMS WITH HANDHELD CONTROLLERS

(71) Applicant: Apple Inc., Cupertino, CA (US)

(72) Inventors: Stephen E Dey, Capitola, CA (US); Erin M Bosch, San Jose, CA (US); Yuhao Pan, Sunnyvale, CA (US); Ian P Colahan, San Jose, CA (US); Christopher K Ewy, San Francisco, CA (US)

(73) Assignee: Apple Inc., Cupertino, CA (US)

(*) Notice: Subject to any disclaimer, the term of this patent is extended or adjusted under 35 U.S.C. 154(b) by 125 days.

(21) Appl. No.: 18/348,943

(22) Filed: Jul. 7, 2023

(65) Prior Publication Data
US 2024/0012496 A1 Jan. 11, 2024

Related U.S. Application Data

(60) Provisional application No. 63/388,196, filed on Jul. 11, 2022.

(51) Int. Cl.
G06F 3/038 (2013.01)
G06F 1/16 (2006.01)
(Continued)

(52) U.S. Cl.
CPC ............ *G06F 3/038* (2013.01); *G06F 1/1694* (2013.01); *G06F 3/016* (2013.01); *G06F 3/03545* (2013.01); *G06F 3/0485* (2013.01)

(58) Field of Classification Search
CPC ........ G06F 3/038; G06F 1/1694; G06F 3/016; G06F 3/03545; G06F 3/0485;
(Continued)

(56) References Cited

U.S. PATENT DOCUMENTS 6,044,165 A * 3/2000 Perona ................. G06V 30/228
382/103
10,146,335 B2 12/2018 Balan et al.
(Continued)

FOREIGN PATENT DOCUMENTS

KR 20020043827 A 6/2002
KR 20040038641 A 5/2004
(Continued)

*Primary Examiner* — Jonathan A Boyd
(74) *Attorney, Agent, or Firm* — Treyz Law Group, P.C.; Kendall P. Woodruff

(57) ABSTRACT

A system may include an electronic device such as a head-mounted device and a handheld controller for controlling the electronic device. The handheld controller may have a housing with an elongated shaft extending between first and second tip portions. The handheld controller may include a touch sensor for gathering touch input, a button, rotating scroll wheel, or other input device for gathering other user input, a force sensor for gathering force input, an inertial measurement unit for gathering motion data, a camera for capturing images of the environment, and/or one or more haptic output devices such as an actuator for providing haptic output. The control circuitry may send control signals to the head-mounted device based on the sensor data and user input (e.g., force input, touch input, motion input, voice input, etc.) gathered with the handheld controller.

20 Claims, 11 Drawing Sheets

(51) Int. Cl.
    *G06F 3/01*          (2006.01)
    *G06F 3/0354*     (2013.01)
    *G06F 3/0485*     (2022.01)

(58) Field of Classification Search
    CPC ........ G06F 3/011; G06F 3/013; G06F 3/0304; G06F 3/0346; G06F 3/0362
    See application file for complete search history.

(56) References Cited

U.S. PATENT DOCUMENTS

| | | |
|---|---|---|
| 10,147,243 B2 | 12/2018 | Yamamoto et al. |
| 10,922,583 B2 | 2/2021 | Kaehler et al. |
| 11,112,932 B2 | 9/2021 | Powderly et al. |
| 11,150,777 B2 | 10/2021 | Kaehler et al. |
| 11,886,650 B2 * | 1/2024 | Poore .................. G02B 27/017 |
| 2013/0194242 A1 * | 8/2013 | Park ...................... B43K 29/00 |
| | | 345/179 |
| 2019/0369752 A1 * | 12/2019 | Ikeda .................. G02B 27/017 |
| 2020/0019257 A1 | 1/2020 | Chang et al. |
| 2022/0413628 A1 | 12/2022 | Lohse et al. |

FOREIGN PATENT DOCUMENTS

| | | |
|---|---|---|
| KR | 101549010 B1 | 9/2015 |
| KR | 20180128127 A | 12/2018 |
| KR | 20190083994 A | 7/2019 |
| KR | 20200035343 A | 4/2020 |

* cited by examiner

COMPUTER SYSTEMS WITH HANDHELD CONTROLLERS

This application claims priority to provisional patent application No. 63/388,196, filed Jul. 11, 2022, which is hereby incorporated by reference herein in its entirety.

FIELD

This relates generally to computer systems and, more particularly, to input devices for computer systems.

BACKGROUND

Electronic devices such as computers can be controlled using computer mice and other input accessories. In virtual reality systems, force-feedback gloves can be used to control virtual objects. Cellular telephones may have touch screen displays and vibrators that are used to create haptic feedback in response to touch input.

Devices such as these may not be convenient for a user, may be cumbersome or uncomfortable, or may provide inadequate feedback.

SUMMARY

A system may include an electronic device such as a head-mounted device and a handheld controller for controlling the electronic device. The head-mounted device or other device may have a display configured to display virtual content that is overlaid onto real-world content.

The handheld controller may have a housing with an elongated shaft extending between first and second tip portions. The housing may have a flat surface and a curved surface. The housing may have first and second housing portions operable in a first mode in which the first and second housing portions are mated with one another and a second mode in which the first and second housing portions are separated from one another to form independent handheld controller devices.

A touch sensor may be located on the curved surface and may be configured to gather touch input such as swipe input, tap input, multitouch input, and other touch input. A button or other input device may be located on the flat surface. A rotating scroll wheel may be mounted in the housing and may be configured to rotate about an axis that is perpendicular or parallel to the longitudinal axis of the elongated housing. One or more sensors may be located in one or both of the tip portions. For example, one of the tip portions may have a force sensor and may be force-sensitive. A tip portion may have a camera for helping track the location of the handheld controller in space, on a surface, or relative to the electronic device that is controlled by the handheld controller. One or more haptic output devices such as an actuator may be mounted in the housing.

Control circuitry in the handheld controller may use the haptic output device to provide haptic output in response to user input such as force input, touch input, motion input, voice input, and/or any other suitable user input. The control circuitry may adjust operational settings of the handheld controller based on the sensor data and user input. The control circuitry may also send control signals to an external electronic device such as a head-mounted device to manipulate display content on the external electronic device, adjust operation settings of the head-mounted device, and/or take other actions in response to the sensor data and user input gathered with the controller.

The handheld controller may include an inertial measurement unit such as one or more accelerometers, gyroscopes, and/or compasses. Visual markers such as passive visual markers and/or active visual markers (e.g., infrared light-emitting diodes) may be formed at one or more locations of the housing of the handheld controller. A head-mounted device may include a camera for capturing images of the handheld controller and the visual markers. Control circuitry in the head-mounted device may be configured to track a location of the handheld controller using the captured images and motion data from the inertial measurement unit.

DETAILED DESCRIPTION

Figure 1:
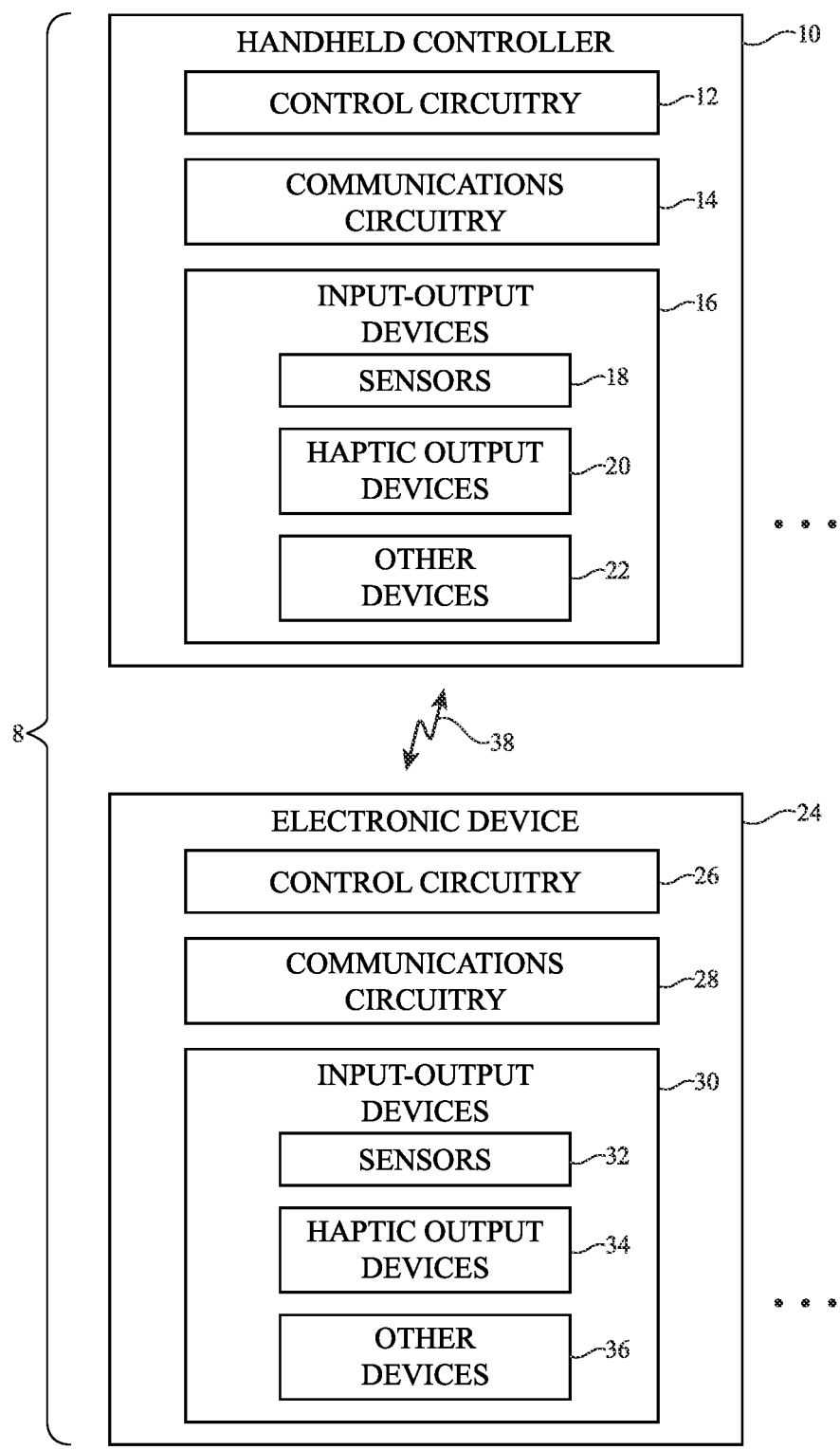
FIG. 1 is a schematic diagram of an illustrative system with a handheld controller in accordance with an embodiment.

Electronic devices that are configured to be held in the hand of a user may be used to gather user input and to provide a user with output. For example, electronic devices that are configured to control one or more other electronic devices, which are sometimes referred to as controllers, handheld controllers, or handheld input devices, may be used to gather user input and to supply output. A handheld controller may, as an example, include an inertial measurement unit with an accelerometer for gathering information on controller motions such as swiping motions, waving motions, writing movements, drawing movements, shaking motions, rotations, etc., and may include wireless communications circuitry for communicating with external equipment such as a head-mounted device, may include tracking features such as active or passive visual markers that can be tracked with an optical sensor in an external electronic device, may include input devices such as touch sensors, force sensors, buttons, knobs, wheels, etc., may include sensors for gathering information on the interactions between the handheld controller, the user's hands interacting with the controller, and the surrounding environment. The handheld controller may include a haptic output device to provide the user's hands with haptic output and may include other output components such as one or more speakers.

One or more handheld controllers may gather user input from a user. The user may use the handheld controllers to control a virtual reality or mixed reality device (e.g., head-mounted equipment such as glasses, goggles, a helmet, or other device with a display). During operation, the handheld controller may gather user input such as information on interactions between the handheld controller(s) and the surrounding environment, interactions between a user's fingers or hands and the surrounding environment, and interactions associated with virtual content displayed for a user. The user input may be used in controlling visual output on a display (e.g., a head-mounted display, a computer display, etc.). Corresponding haptic output may be provided to the user's fingers using the handheld controller. Haptic output may be used, for example, to provide the fingers of a user with a desired sensation (e.g., texture, weight, torque, pushing, pulling, etc.) as the user interacts with real or virtual objects using the handheld controller. Haptic output can also be used to create detents, to provide localized or global haptic feedback in response to user input that is supplied to the handheld controller, and/or to provide other haptic effects.

Handheld controllers can be held in one or both of a user's hands. Users can use the handheld controllers to interact with any suitable electronic equipment. For example, a user may use one or more handheld controllers to interact with a virtual reality or mixed reality system (e.g., a head-mounted device with a display), to supply input to a desktop computer, tablet computer, cellular telephone, watch, ear buds, or other accessory, to control household items such as lighting, televisions, thermostats, appliances, etc., or to interact with other electronic equipment.

FIG. 1 is a schematic diagram of an illustrative system of the type that may include one or more handheld controllers. As shown in FIG. 1, system 8 may include electronic device(s) such as handheld controller(s) 10 and other electronic device(s) 24. Each handheld controller 10 may be held in the hand of a user. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a handheld controller having an elongated marker-shaped housing configured to be grasped within a user's fingers or a housing with other shapes configured to rest in a user's hand, and device(s) 24 is a head-mounted device, cellular telephone, tablet computer, laptop computer, wristwatch device, a device with a speaker, or other electronic device (e.g., a device with a display, audio components, and/or other output components). A handheld controller with a marker-shaped housing may have an elongated housing that spans across the width of a user's hand and that can be held like a pen, pencil, marker, wand, or tool.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 28, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 30 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors (e.g., ultrasonic sensors for tracking device orientation and location and/or for detecting user input such as finger input), and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing interferometric sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or other suitable rotary button that rotates and that optionally can be depressed to select items of interest). Alphanumeric keys and/or other buttons may be included in devices 16 and/or 30. In some configurations, sensors 18 may include joysticks, roller balls, optical sensors (e.g., lasers that emit light and image sensors that track motion by monitoring and analyzing changings in the speckle patterns and other information associated with surfaces illuminated with the emitted light as device 10 is moved relative to those surfaces), fingerprint sensors, and/or other sensing circuitry. Radio-frequency tracking devices may be included in sensors 18 to detect location, orientation, and/or range. Beacons (e.g., radio-frequency beacons) may be used to emit radio-frequency signals at different locations in a user's environment (e.g., at one or more registered locations in a user's home or office). Radio-frequency beacon signals can be analyzed by devices 10 and/or 24 to help determine the location and position of devices and/or 24 relative to the beacons. If desired, devices 10 and/or 24 may include beacons. Frequency strength (received signal strength information), beacon orientation, time-of-flight information, and/or other radio-frequency information may be used in determining orientation and position information. At some frequencies (e.g., lower frequencies such as frequencies below 10 GHz), signal strength information may be used, whereas at other frequencies (e.g., higher frequencies such as frequencies above 10 GHz), indoor radar schemes may be used). If desired, light-based beacons, ultrasonic beacons, and/or other beacon devices may be used in system 8 in addition to or instead of using radio-frequency beacons and/or radio-frequency radar technology.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators (e.g., linear resonant actuators), rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in applying a sensation on a user's fingers (e.g., a sensation of weight, texture, pulling, pushing, torque, etc.) and/or otherwise directly interacting with a user's fingers. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals.

Figure 2:
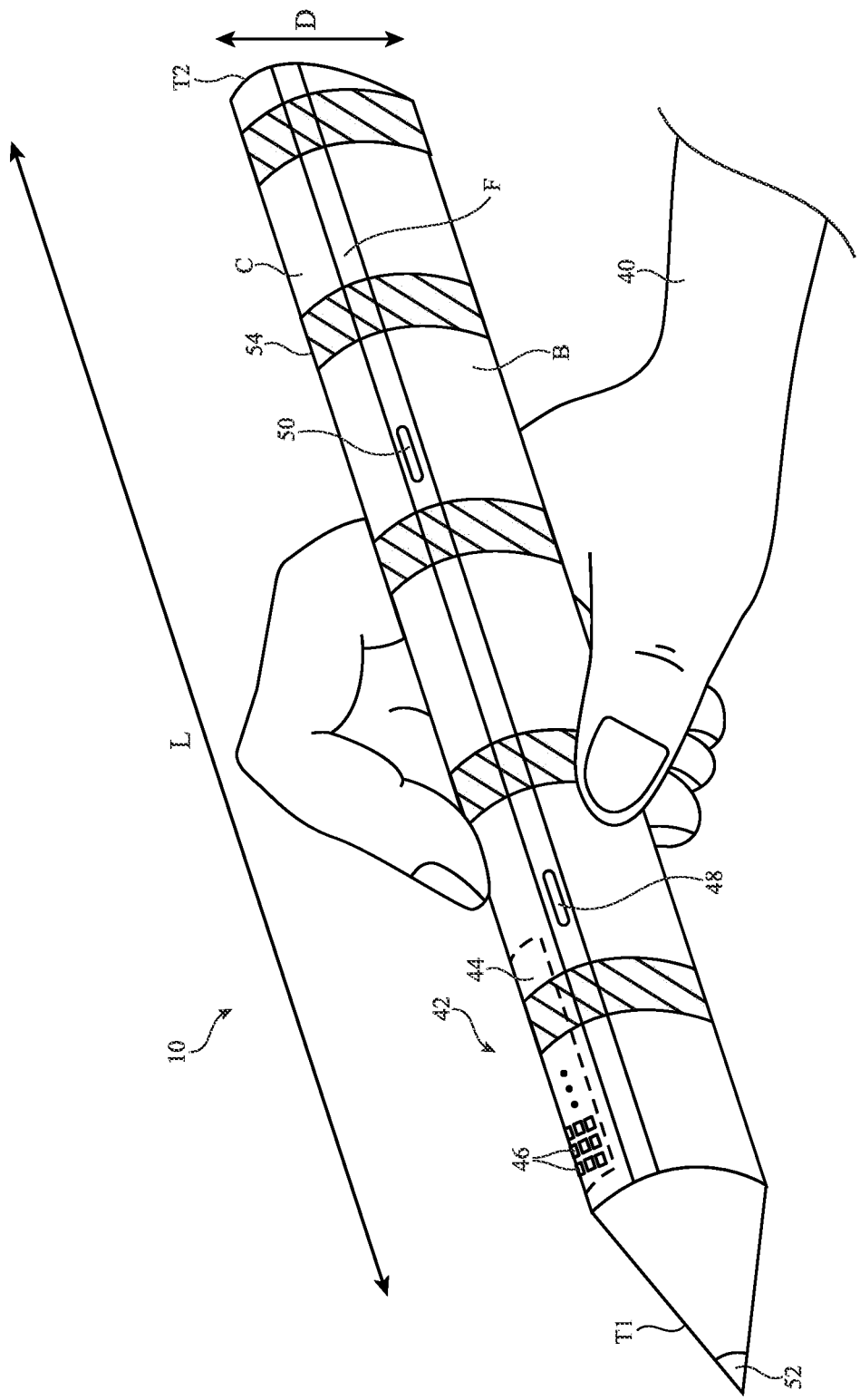
FIG. 2 is a perspective view of an illustrative handheld controller in accordance with an embodiment.

FIG. 2 is a perspective view of a user's hands (hands 40) and an illustrative handheld controller 10. As shown in FIG. 2, controller 10 may be an elongated marker-shaped electronic device that fits within the user's hand 40. The elongated shape of controller 10 allows hand 40 to hold controller 10 as if it were a pen, pencil, marker, or other writing implement. In other configurations, controller 10 may be held in hand 40 as a wand or baton would be held. In general, controller 10 may be held in hand 40 in any suitable manner (e.g., at the end, in the middle, between two, three, four, or all five fingers, with both hands, etc.).

A user may hold one or more of devices 10 simultaneously. For example, a user may hold a single one of devices 10 in the user's left or right hand. As another example, a user may hold a first device 10 in the user's left hand and a second device 10 in the user's right hand. Arrangements in which multiple devices 10 are held in one hand may also be used. Configurations in which devices 10 have bodies that are held within a user's hands are sometimes described herein as an example.

Control circuitry 12 (and, if desired, communications circuitry 14 and/or input-output devices 16) may be contained entirely within device 10 (e.g., in housing 54) and/or may include circuitry that is located in an external structure (e.g., in an external electronic device such as device 24, a console, a storage case, etc.).

In general, electrical components such as control circuitry 12, communications circuitry 14, and/or input-output devices 16 (e.g., sensors 18, haptic output devices 20, and/or other devices 22) may be mounted within and/or on the surface(s) of controller housing 54 in any suitable locations.

As shown in FIG. 2, housing 54 may have an elongated marker shape, elongated tube shape, elongated cylindrical shape, and/or any other elongated shape. Housing 54 which may sometimes be referred to as an enclosure, body, or case, may be formed of plastic, glass, ceramics, fiber composites, metal (e.g., stainless steel, aluminum, etc.), fabric, other suitable materials, or a combination of any two or more of these materials. Housing 54 may be formed using a unibody configuration in which some or all of housing 54 is machined or molded as a single structure or may be formed using multiple structures (e.g., an internal frame structure, one or more structures that form exterior housing surfaces, etc.). Housing 54 may form outer housing walls, tip portions, and/or internal support structures for device 10. Housing 54 may have a length L between 140 mm and 150 mm, between 130 mm and 160 mm, between 100 mm and 200 mm, between 120 mm and 160 mm, greater than 180 mm, less than 180 mm, or any other suitable length. The diameter D of housing 54 may be between 12 mm and 14 mm, between 10 mm and 15 mm, between 11 mm and 16 mm, between 15 mm and 20 mm, between 18 mm and 25 mm, greater than 25 mm, less than 25 mm, or any other suitable diameter.

Housing 54 may have one or more curved surfaces and one or more planar surfaces. In the illustrative example of FIG. 2, device 10 has a curved surface C that wraps around a first portion of device 10 and a flat surface F that extends along a second portion of device 10. If desired, flat surface F may be located on a first side of device 10 and curved surface C may be located on a second opposing side of device 10. Curved surface C and flat surface F wrap around device 10 to form an elongated tube shape that surrounds an elongated interior space for housing internal components such as control circuitry 12, communications circuitry 14, and input-output devices 16. Housing 54 may have an elongated shaft portion such as shaft B extending between first and second tip portions such as tip portion T1 at a first end of device 10 and tip portion T2 at a second opposing end of device 10. One or both of housing tip portions T1 and T2 may be removable from the main elongated shaft B between tip portions T1 and T2.

Ultrasonic sensors, optical sensors, inertial measurement units, touch sensors such as capacitive touch sensor electrodes, strain gauges and other force sensors, radio-frequency sensors, and/or other sensors may be used in gathering sensor measurements indicative of the activities of device 10 and/or hand 40 holding device 10.

In some configurations, controller position, movement, and orientation may be monitored using sensors that are mounted in external electronic equipment (e.g., in a computer or other desktop device, in a head-mounted device or other wearable device, and/or in other electronic device 24 that is separate from device 10). For example, optical sensors such as images sensors that are separate from device 10 may be used in monitoring device 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices. The light-emitting devices may include light-emitting diodes, lasers (e.g., laser diodes, vertical cavity surface-emitting lasers, etc.), or other light sources and may operate at visible wavelengths, ultraviolet wavelengths, and/or infrared wavelengths. The light-emitting devices may be arranged in an asymmetric pattern on housing 54 and may emit light that is detected by an image sensor, depth sensor, and/or other light-based tracking sensor circuitry in device 24 (e.g., a head-mounted device, desktop computer, stand-alone camera-based monitoring systems, and/or other electrical equipment with an image sensor or other tracking sensor circuitry). By processing the received patterned of emitted light, device 24 can determine the position, orientation, and/or motion of device 10. If desired, the light-emitting devices can be removable and/or customizable (e.g., a user can customize the location and type of light-emitting devices).

Tracking can also be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10. These sensors may include image sensors that gather frames of image data of the surroundings of devices 10 and may be used in measuring position, orientation, and/or motion from the frame of image data. Lidar, ultrasonic sensors oriented in multiple directions, radio-frequency tracking sensors, and/or other controller tracking arrangements may be used, if desired. In some arrangements, user input for controlling system 8 can include both user input to controller 10 and other user input (e.g., user eye gaze input, user voice input, etc.). For example, gaze tracking information such as a user's point-of-gaze measured with a gaze tracker can be fused with controller input to controller 10 when controlling device 10 and/or devices 24 in system 8. A user may, for example, gaze at an object of interest while device 10 uses one or more of sensors 18 (e.g., an accelerometer, force sensor, touch sensor, etc.) to gather information such as tap input (tap input in which a user taps on device 10 with one or more fingers, tap input in which device 10 taps a table top or other external surface or object, and/or any other tap input resulting in measurable forces and/or accelerometer output from device 10), double-tap input, force input, controller gestures (tapping, swiping, twirling, shaking, writing, drawing, painting, sculpting, gaming, and/or other gestures with device 10, gestures on external surfaces with device 10, gestures on external objects with device 10, gestures interacting with virtual objects, gestures with controller 10 in the air, etc.), drag and drop operations associated with objects selected using a lingering gaze or other point-of-gaze input, etc. The controller input from controller 10 to system 8 may include information on finger orientation, position, and/or motion relative to controller 10, may include information on how forcefully a finger is pressing against surfaces of controller 10 (e.g., force information), may include information on how forcefully controller 10 is pressed against an object or external surface (e.g., how forcefully a tip portion such as tip portion T1 presses against an external surface), may include controller pointing input (e.g., the direction in which controller 10 is pointing), which may be gathered using radio-frequency sensors among sensors 18 and/or other sensors in device(s) 10, and/or may include other controller input.

By correlating user input from a first of devices 10 with user input from a second of devices 10 and/or by otherwise analyzing controller sensor input, multi-device input may be detected and used in manipulating virtual objects or taking other actions in system 8. Consider, as an example, the use of a tap gesture with device 10 to select a virtual object associated with a user's current point-of-gaze. Once the virtual object has been selected based on the direction of the user's point-of-gaze (or controller pointing direction input) and based on the tap gesture input or other user input, further user input gathered with one or more devices 10 may be used to rotate and/or otherwise manipulate the virtual object. For example, information on controller movement (e.g., rotational movement) may be gathered using an internal measurement unit or other sensor 18 in device(s) 10 and this rotational input may be used to rotate the selected object. In some scenarios, an object may be selected based on point-of-gaze (e.g., when a user's point-of-gaze is detected as being directed toward the object) and, following selection, object attributes (e.g., virtual object attributes such as virtual object appearance and/or real-world object attributes such as the operating settings of a real-world device) can be adjusted using strain gauge input, touch sensor input, controller orientation input (e.g., to rotate a virtual object, etc.).

If desired, gestures such as air gestures (three-dimensional gestures) with device 10 may involve additional input. For example, a user may control system 8 using hybrid gestures that involve movement of device(s) 10 through the air (e.g., an air gesture component) and that also involve contact between device 10 and one or more fingers of hand 40. As an example, an inertial measurement unit in device 10 and/or a camera in device 24 may detect user movement of device 10 through the air (e.g., to trace out a path) while a sensor 18 in device 10 such as a two-dimensional touch sensor, a force sensor, or other sensor 18 detects force input, touch input, or other input associated with contact to device 10.

The sensors in device 10 may, for example, measure how forcefully a user is moving device 10 against a surface (e.g., in a direction perpendicular to the surface) and/or how forcefully a user is moving device 10 along a surface (e.g., shear force in a direction parallel to the surface). The direction of movement of device 10 can also be measured by the force sensors and/or other sensors 18 in device 10.

Information gathered using sensors 18 such as force sensor input gathered with a force sensor, motion data gathered with a motion sensor (e.g., pointing input, rotations, etc.), location information indicating the location of controller 10, touch input gathered with a touch sensor, and other user input may be used to control external equipment such as device 24. For example, control circuitry 12 may send control signals to device 24 that include instructions to select a user interface element, instructions to scroll display content, instructions to select a different input function for controller 10 (e.g., to switch from using controller 10 as a drawing or writing implement to using controller 10 as a pointing device or game piece), instructions to draw a line or type a word on a display in device 24, instructions to adjust operational settings of device 24, instructions to manipulate display content on device 24, and/or instructions to take any other suitable action with device 24. These control signals may be sent in addition to or instead of providing feedback to sensor input from device 10 (e.g., haptic output, audio output, adjusting operational settings of device 10, etc.).

In the illustrative configuration of FIG. 2, device 10 includes touch sensor 42. Touch sensor 42 may be formed from an array of capacitive touch sensor electrodes such as electrodes 46 overlapping one or more surfaces of housing 54 such as curved surface C, flat surface F, and/or surfaces on tip portions T1 and T2. Touch sensor 42 may be configured to detect swipes, taps, multitouch input, squeeze input, and/or other touch input. In some arrangements, touch sensor 42 is formed from a one-dimensional or two dimensional array of capacitive electrodes 46. In some arrangements, touch sensor 42 may be a strain gauge that detects squeeze input to housing 54 (e.g., when a user squeezes or pinches device 10 between the user's fingers). Touch sensor 42 may be used to gather touch input such as input from direct contact and/or close proximity with a different finger of the user or other external object. In the example of FIG. 2, touch sensor 42 overlaps touch input area 44 on curved surface C of device 10. If desired, additional touch input may be gathered in adjacent areas such as flat surface F of housing 54. If desired, touch sensor 42 may include other types of touch sensing technologies such as optical touch sensors, acoustic-based touch sensors, etc. Touch sensor 42 may span the length L of device 10, may span only partially along length L of device 10, may cover some or all of curved surface C, may cover some or all of flat surface F, and/or may cover some or all of tip portions T1 and T2. If desired, touch sensor 42 may be illuminated, may overlap a display (e.g., to form a touch-sensitive display region on device 10), may overlap an indicator or textured surface, and/or may otherwise be visually or tangibly distinct from the surrounding non-touch-sensitive portions of housing 54 (if desired).

In addition to or instead of touch sensor 42, device 10 may include one or more other user input devices such as user input device 48. User input device 48 may be a mechanical input device such as a pressable button, a rotating knob, a rotating wheel, a rocker switch, a slider, or other mechanical input device, a force sensor such as a strain gauge or other force sensor, an optical sensor such as a proximity sensor, a touch sensor such as a capacitive, acoustic, or optical touch sensor, and/or any other suitable input device for receiving input from a user's hand 40. If desired, one of haptic output devices 20 such as an actuator may be used to provide haptic feedback in response to user input to device 48. For example, input device 48 may be a touch-sensitive button that does not physically move relative to housing 54, but the user may feel a localized button click sensation from haptic output that is provided from an actuator 20 overlapping device 48.

Haptic output devices 20 may be located in any suitable position within housing 54. In one illustrative arrangement, one or more haptic output devices 20 may be located at each end of shaft B such as at one or both of tip portions T1 and T2. Haptic output devices 20 may be configured to provide localized haptic feedback and/or global haptic feedback. Localized haptic feedback may be more prominent in a particular location of housing 54 relative to other portions of housing 54 (e.g., local haptic feedback may be more prominent at one or both of tip portions T1 and T2). Local haptic effects may be achieved by arranging the axis of a linear resonant actuator within housing 54 to be perpendicular to the longitudinal axis of device 10 (e.g., perpendicular to length L). Haptic output devices 20 may additionally or instead provide global haptic feedback that is prominent across most or all of the length of device 10. To achieve global haptic effects, the axis of a linear resonant actuator may be arranged in housing 54 to be parallel to the longitudinal axis of device 10 (e.g., parallel to length L).

In addition to or instead of touch sensor 42 and input device 48, device 10 may include one or more sensors at tip portions T1 and T2. For example, tip portion T1 and/or tip portion T2 may be force-sensitive. As shown in FIG. 2, device 10 may include sensor 52. Sensor 52 may be located at one or both of tip portions T1 and T2 and/or may be located elsewhere in device 10 such as at a location along shaft B of device 10. Shaft B, which may sometimes be referred to as a cylindrical housing, may form an elongated main body portion of housing 54 of device 10 that extends between tip T1 and tip T2. One or more of tip portions T1 and T2 may be removable and may sometimes be referred to as a cap, a writing tip, etc. Sensors at tip portions T1 and T2 such as sensor 52 may include a device position sensor (e.g., an optical flow sensor having a light source that illuminates a portion of a surface that is contacted by device 10 and having an image sensor configured to determine a location of device 10 on the surface and/or to measure movement of the electronic device relative to the surface based on captured images of the illuminated portion, a mechanical position sensor such as an encoded wheel that tracks movements of device 10 on the surface, or other device position sensor), a force sensor (e.g., one or more strain gauges, piezoelectric force sensors, capacitive force sensors, and/or any other suitable force sensor), an optical proximity sensor such a light-emitting diode and light detector, a camera (e.g., a one-pixel camera or an in image sensor with a two-dimensional array of pixels), and/or other sensor.

If desired, power can be conveyed wirelessly between device 10 and an external electronic device such as device 24 (e.g., a head-mounted device, a wireless charging mat, a storage case, a battery case, a wireless charging puck, or other electronic device). As an example, contacts (e.g., metal pads) may be capacitively coupled (without forming ohmic contact) to allow power to be transferred and/or power can be conveyed using a wireless power transmitter with a coil in device 24 to transmit wireless power signals to a wireless power receiver with a coil in device 10. Inductive power transfer techniques may be used (e.g., wireless power can be transmitted using one or more wireless power transmitting coils in device 24 and transmitted wireless power signals can be received in a power receiving circuit in device 10 using a power receiving coil such as coil 50). Received alternating-current wireless power signals from device 24 can be converted to direct-current power using a rectifier in device 10 for charging a battery in device 10 and/or for powering circuitry in device 10. In configurations in which the power receiving circuit of device 10 receives power via a wired connection (e.g., using terminals), the power receiving circuit in device 10 may provide the received power to a battery and/or other circuitry in device 10.

To help align wireless charging coil 50 in device 10 with a wireless charging coil in device 24 and/or to otherwise hold device 10 to a power source or other device (e.g., device 24 of FIG. 1), device 10 and device 24 may be provided with mating alignment features (e.g., mating protrusions and recesses and/or other interlocking alignment structures (e.g., key and keyhole structures that allow device 10 and/or device 24 to interlock when engaged by twisting or other locking motions), magnets (or ferromagnetic elements such as iron bars), and/or other alignment structures.

In configurations in which device 10 includes magnetic attachment structures (e.g., magnets, magnetic material that is attracted to magnets, or other magnetic attachment structures), device 10 may be held against the interior and/or exterior of device 24 using the magnetic attachment structures. For example, device 24 may be a battery case with a groove or other recess that receives device 10. Magnetic attachment structures in device 24 (e.g., near the groove) and in device 10 may corporate (magnetically attached) to help secure device 10 within the interior of the case (e.g., without allowing device 10 to rattle excessively inside the case). As another example, device 24 may be a head-mounted device (e.g., goggles and/or glasses) or a strap or other wearable device. In this type of arrangement, magnetic attachment structures may hold device 10 against an exterior surface of device 24 (e.g., against a portion of the housing of a pair of goggles or glasses such as along the frame of a pair of glasses, to the front, top, or side surface of a pair of goggles, etc.) or within a recess in the housing of device 24. Magnets and other alignment features may be located near coil 50 or may be located in other portions of housing 54.

Figure 3:
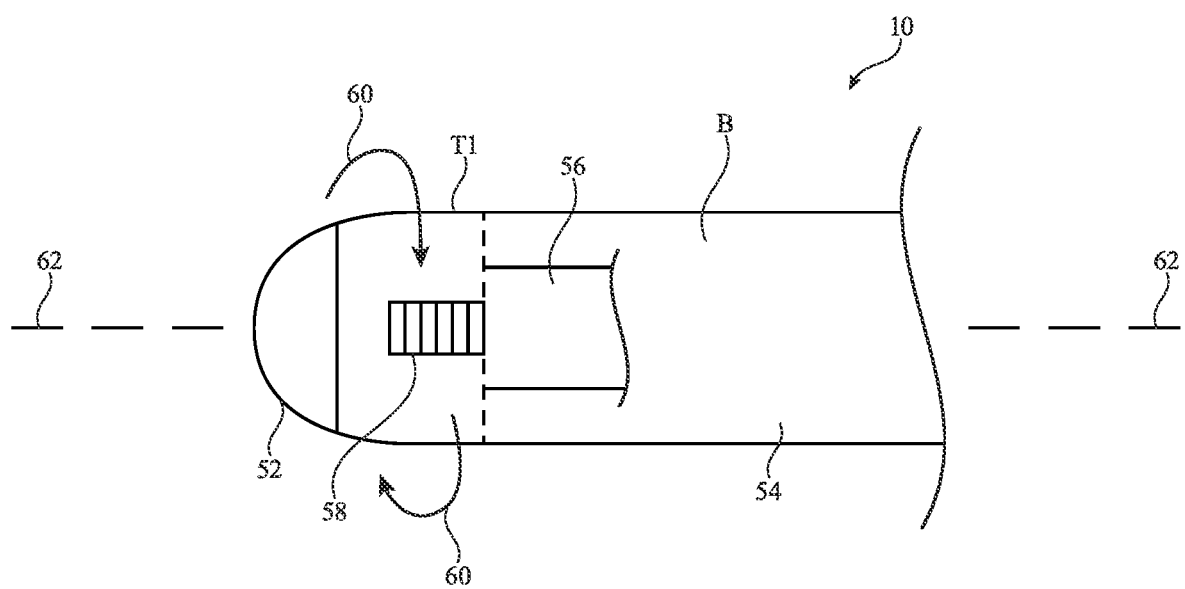
FIG. 3 is a cross-sectional side view of an illustrative handheld controller with a removable tip portion in accordance with an embodiment.

FIG. 3 is a cross-sectional side view of an illustrative portion of device 10 showing how one or more tip portions of device 10 may be removable. As shown in FIG. 3, device 10 may include a housing 54 having a shaft B that extends parallel to longitudinal axis 62 of device 10. Tip portion T1 may be removably attached to main body portion B using an attachment structure such as attachment structure 58. Attachment structure 58 may be one or more screws, a friction fit, magnetic attachment structures (e.g., magnets, magnetic material that is attracted to magnets, or other magnetic attachment structures), clasps, clips, interlocking engagement features, or any other suitable attachment structure. In configurations where attachment structure 58 is a screw, the screw may be mounted to an internal support structure such as support structure 56 in main body portion B and the screw portion 58 may extend from support structure 56 into tip portion T1. Tip portion T1 may have threads that mate with the threads on attachment structure 58. A user may remove tip portion T1 by twisting tip portion T1 relative to main body portion B. Tip portion T1 may be mounted back on main body portion B twisting tip portion T1 relative to main body portion B rotating in directions 60. In configurations where tip portion T1 includes a sensor 52 such as a force sensor that forms a touch-sensitive tip on device 10, a user may be able to replace the force-sensitive tip in the event of damage by removing the tip portion T1 and replacing it with a new tip portion.

Figure 4:
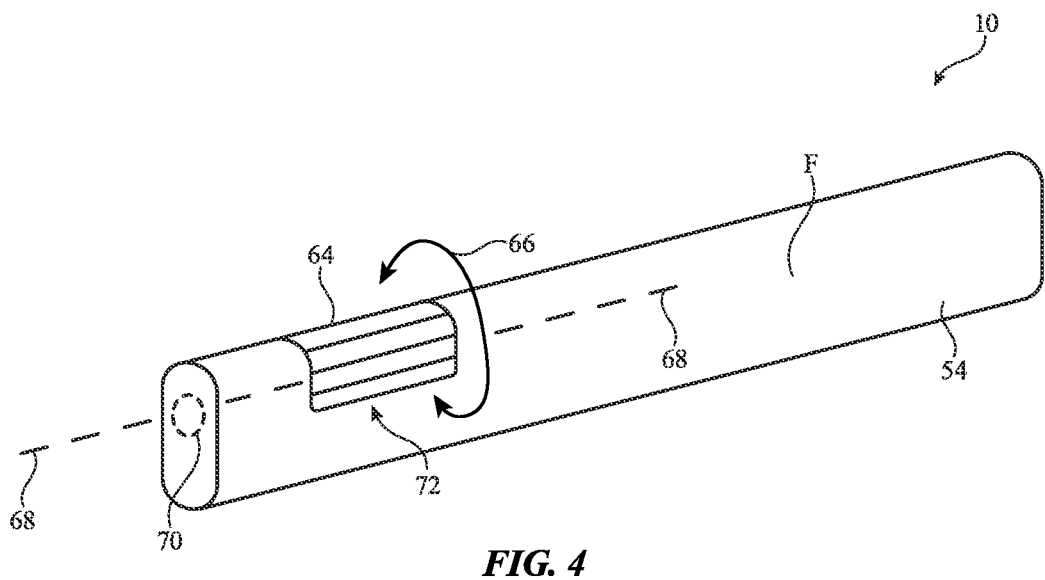
FIG. 4 is a perspective view of an illustrative handheld controller with a knob that rotates about a longitudinal axis of the handheld controller in accordance with an embodiment.
Figure 5:
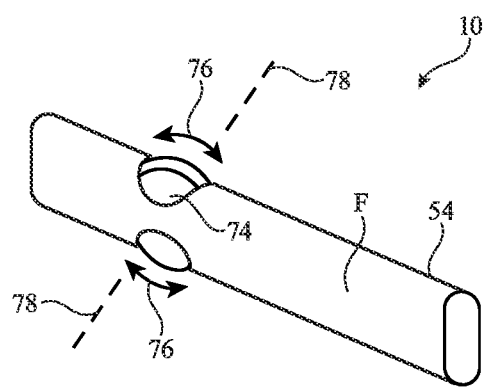
FIG. 5 is a perspective view of an illustrative handheld controller with a knob that is accessible on two opposing sides of the handheld controller and that rotates about an axis that is perpendicular to the longitudinal axis of the handheld controller in accordance with an embodiment.
Figure 6:
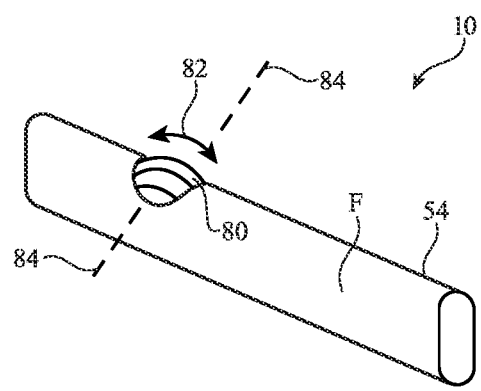
FIG. 6 is a perspective view of an illustrative handheld controller with a knob that is accessible on one side of the handheld controller and that rotates about an axis that is perpendicular to the longitudinal axis of the handheld controller in accordance with an embodiment.

FIGS. 4, 5, and 6 show illustrative shapes for device 10 and different forms of input devices that may be included in device 10. In the example of FIG. 4, housing 54 has a pill-shaped cross section with first and second opposing flat surfaces F joined by upper and lower curved surfaces. If desired, one or more openings such as opening 70 may be formed on one or both ends of housing 54 to form a connector port (for sending and/or receiving data signals, power signals, ground signals, etc.), an audio port (e.g., one or more openings through which sound passes to reach a microphone in device 10, one or more openings through which sound emitted from a speaker in device 10 passes, and/or an opening that forms an audio jack for receiving an audio cable), a window for a sensor in device 10 such as an optical sensor, or other opening.

In the example of FIG. 4, device 10 includes an input device such as rotating scroll wheel 64. Wheel 64 may be mounted in an opening in housing 54 such as opening 72. Wheel 64 may be configured to rotate about axis 68 (e.g., an axis that is parallel to the longitudinal axis of device 10) in directions 66. Control circuitry 12 may be configured to detect rotation of wheel 64 and may take appropriate action based on the rotation of wheel 64. This may include, for example, adjusting one or more settings or operational modes of device 10, selecting a virtual tip for device 10 (e.g., scrolling through different types of tools that device 10 is being used for in a virtual setting such as a paint brush, a pencil, pen, or other writing implement, a sculpting tool, etc.), sending control signals to an external electronic device such as device 24 (e.g., to scroll content on a display of device 24, to select an option being displayed on a display of device 24, etc.), and/or other actions.

In the example of FIG. 5, device 10 has a similar shape to that of FIG. 4. Housing 54 may have a pill-shaped cross-section with first and second opposing flat surfaces F joined by upper and lower curved surfaces. Device 10 includes an input device such as rotating scroll wheel 74. Wheel 74 may be accessible through first and second openings. For example, housing 54 may have a first opening on a first side of device 10 (e.g., in one of the curved surfaces of housing 54) and a second opening on a second side of device 10 (e.g., in the opposing curved surface of housing 54). Wheel 74 may be configured to rotate about axis 78 (e.g., an axis that is perpendicular to the longitudinal axis of device 10) in directions 76. Control circuitry 12 may be configured to detect rotation of wheel 74 and may take appropriate action based on the rotation of wheel 74 (e.g., by adjusting one or more settings or operational modes of device 10, by selecting a virtual tip for device 10, by sending control signals to an external electronic device such as device 24 to scroll content on a display of device 24, to select an option being displayed on a display of device 24, and/or other actions).

In the example of FIG. 6, device 10 includes an input device such as rotating scroll wheel 80. Wheel 80 may be accessible through an opening in housing 54 and may be configured to rotate about axis 84 (e.g., an axis that is perpendicular to the longitudinal axis of device 10) in directions 82. Control circuitry 12 may be configured to detect rotation of wheel 80 and may take appropriate action based on the rotation of wheel 80 (e.g., by adjusting one or more settings or operational modes of device 10, by selecting a virtual tip for device 10, by sending control signals to an external electronic device such as device 24 to scroll content on a display of device 24, to select an option being displayed on a display of device 24, and/or other actions).

Figure 7:
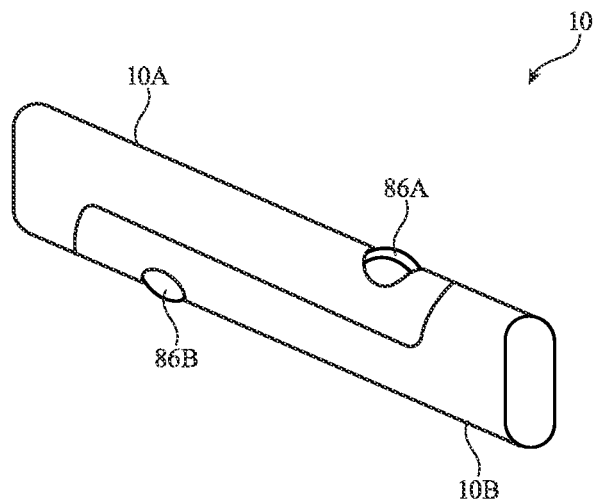
FIG. 7 is a perspective view of an illustrative handheld controller having first and second mating housing portions in accordance with an embodiment.
Figure 8:
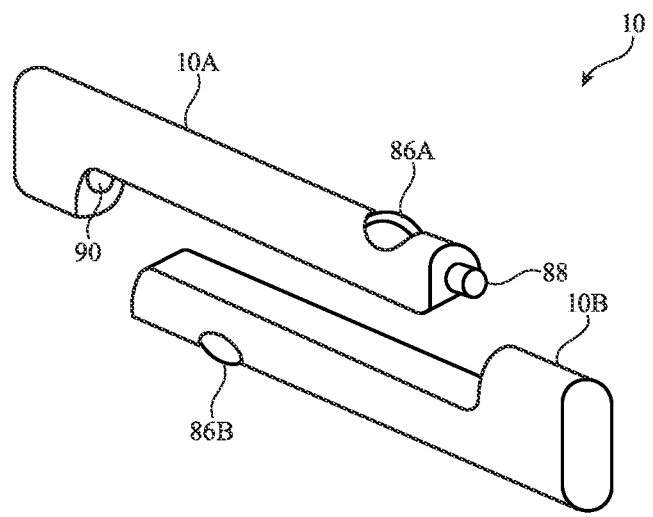
FIG. 8 is perspective view of the illustrative handheld controller of FIG. 7 in a configuration where the first and second mating housing portions have been separated from one another in accordance with an embodiment.

FIGS. 7 and 8 show an illustrative arrangement for device 10 in which device 10 includes first and second separable portions that form first and second controllers. As shown in FIG. 7, device 10 may include first controller 10A and second controller 10B. In the configuration of FIG. 7, controllers 10A and 10B are connected and mated with one another. In the configuration of FIG. 8, controllers 10A and 10B are separated from one another and may be independently used to control external equipment such as device 24.

Controllers 10A and 10B may be coupled together using interlocking engagement features, screws, press fit connections, magnets, magnetic material that is attracted to magnets, other magnetic attachment structures, and/or other attachment structures. As shown in FIG. 8, for example, controller 10A and controller 10B have mating engagement features such as protrusion 88 and opening 90. Protrusion 88 on controller 10A may be configured to mate with a corresponding opening 90 on controller 10B, and protrusion 88 on controller 10B may be configured to mate with a corresponding opening 90 on controller 10A.

If desired, each separable piece of device 10 such as controller 10A and controller 10B may have individual input devices. For example, controller 10A may have input device 86A for receiving user input and controller 10B may have input device 86B for receiving user input. Input devices 86A and 86B may include one or more buttons, scroll wheels, touch sensors, switches, etc.). This may allow more than one user to use device 10 (e.g., a first user may control external equipment using controller 10A and a second user may control external equipment using controller 10B). This may also allow a single user to use a controller in each hand (e.g., controller 10A may be held in a left hand of a user and controller 10B may be held in the right hand of the user).

If desired, each piece of device 10 such as controller 10A and 10B may have separate circuitry such as separate control circuitry 12, communications circuitry 14, and input-output devices 16. In other arrangements, some of the circuitry of device 10 may be located in one controller such as controller 10A and not in controller 10B (or vice versa). If desired, the input-output capabilities of one controller may be shared with the other controller. For example, the wireless control circuitry of one controller such as controller 10A may gather user input from the other controller such as controller 10B and may send corresponding control signals to external equipment. Button press input, touch input, force input, or pointing input received by controller 10A may be used to control the operational settings of controller 10B (as an example).

Figure 9:
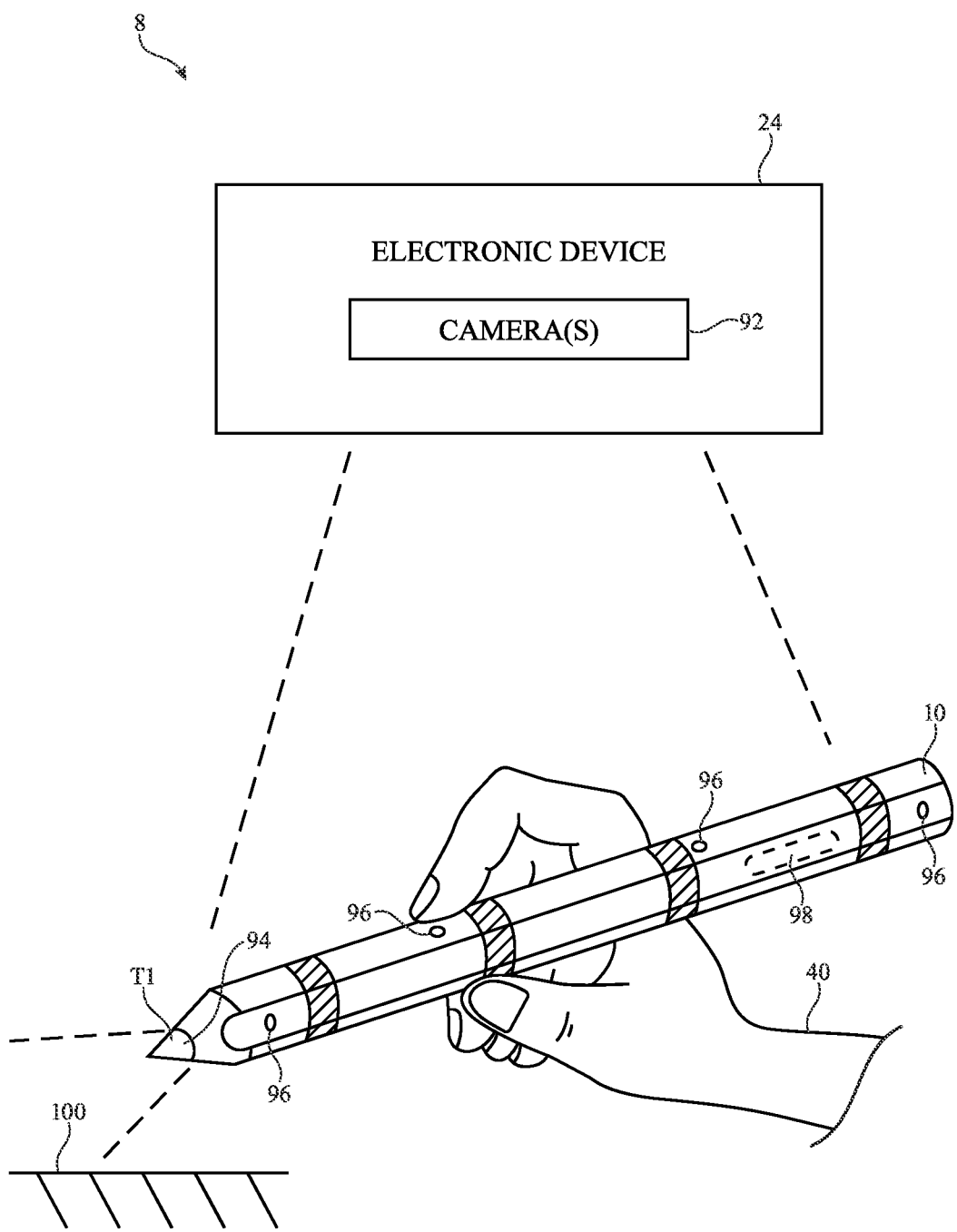
FIG. 9 is a diagram of an illustrative system including a handheld controller and an electronic device configured to track a location of the handheld controller in accordance with an embodiment.

As shown in FIG. 9, external equipment such as electronic device 24 in system 8 may contain sensors such as one or more cameras 92 (e.g., visual light cameras, infrared cameras, etc.). Electronic device 24 may, as an example, be a head-mounted device such as augmented reality (mixed reality) or virtual reality goggles (or glasses, a helmet, or other head-mountable support structures). Visual markers such as markers 96 may be placed on device 10. Markers 96 may be, for example, passive visual markers such as bar codes, cross symbols, reflectors, or other visually identifiable patterns and may be applied to any suitable location of device 10. Markers 96 may, if desired, include active visual markers formed from light-emitting components (e.g., visual light-emitting diodes and/or infrared light-emitting diodes modulated using identifiable modulation codes) that are detected using cameras such as camera 92. Markers 96 may help inform system 8 of the location of controller 10 as a user is interacting with a computer or other equipment in system 8. If desired, device 10 may include an optical sensor such as sensor 94 in tip portion T1. Optical sensor 94 may be a one-pixel camera or a two-dimensional array of pixels that forms an image sensor. Sensor 94 may be configured to capture images of the environment, which can be used by control circuitry 12 in device 10 and/or control circuitry 26 in device 24 to help track the location of device 10. This may be useful in scenarios where hand 40 is blocking visual markers 96 on device 10, for example.

Visual markers 96 on device 10 and/or inertial measurement units such as inertial measurement unit 98 (e.g., accelerometers, compasses, and/or gyroscopes) may be used in tracking the location of device 10 relative to device 24 and/or relative to an external object such as surface 100. At the same time, system 8 may display associated visual content for the user (e.g., using a display on device 24). The user may interact with the displayed visual content by supplying force input (e.g., to force sensor 52 in force-sensitive tip portion T1 of FIG. 2), motion input (e.g., air gestures, pointing gestures, rotations, etc.) detected by motion sensor 98, taps, shear force input, touch input (e.g., to touch sensor 42 of FIG. 2) and other input to device 10.

For example, information on the location of device 10 relative to device 24 and/or surface 100 may be gathered by control circuitry 12 in device 10 or by control circuitry 26 of device 24 (e.g., head-mounted device, a computer, cellular telephone, or other electronic device) during operation of system 8 while monitoring device 10 for force input, gesture input (e.g., taps, three-dimensional air gestures, pointing input, writing or drawing input, etc.), touch input, and/or any other user input indicating that a user has selected (e.g., highlighted), moved, or otherwise manipulated a displayed visual element and/or provided commands to system 8. As an example, a user may make an air gesture with device 10 such as waving device 10 to the left to move visual content to the left. System 8 may use an inertial measurement unit in device 10 to detect the left hand wave gesture and can move visual elements being presented to the user with a display in device 24 in response to the left hand wave gesture. As another example, a user may select a visual element in the user's field of view by tapping on that element with device 10 and/or pointing towards the element with device 10. A user may draw, paint, or otherwise move device 10 along surface 100 to form a corresponding drawing, painting, or other visual output on a display of device 24.

In this way, control circuitry 12 in device 10 and/or control circuitry 26 in device 24 may allow a user to manipulate visual elements being viewed by the user (e.g., virtual reality content or other visual content being presented with a head-mounted device such as augmented reality goggles or other device 24 with a display). If desired, a camera such as camera 92 may face the eyes of a user (e.g., camera 92 or other visual tracking equipment may form part of a gaze tracking system). The camera and/or other circuitry of the gaze tracking system may monitor the direction in which a user is viewing real-world objects and visual content. As an example, a camera may be used to monitor the point of gaze (direction of gaze) of a user's eyes as the user is interacting with virtual content presented by device 24 and as the user is holding controller 10 in hand 40. Control circuitry 12 in device 10 and/or control circuitry 26 in device 24 may measure the amount of time that a user's gaze dwells in particular locations and can use this point-of-gaze information in determining when to select virtual objects. Virtual objects can also be selected when it is determined that a user is viewing a particular object (e.g., by analyzing point-of-gaze information) and when it is determined that a user has made a voice command, finger input, button press input, or other user input to select the particular object that is being viewed. Point-of-gaze information can also be used during drag and drop operations (e.g., to move virtual objects in accordance with movement of the point-of-gaze from one location in a scene to another).

Figure 10:
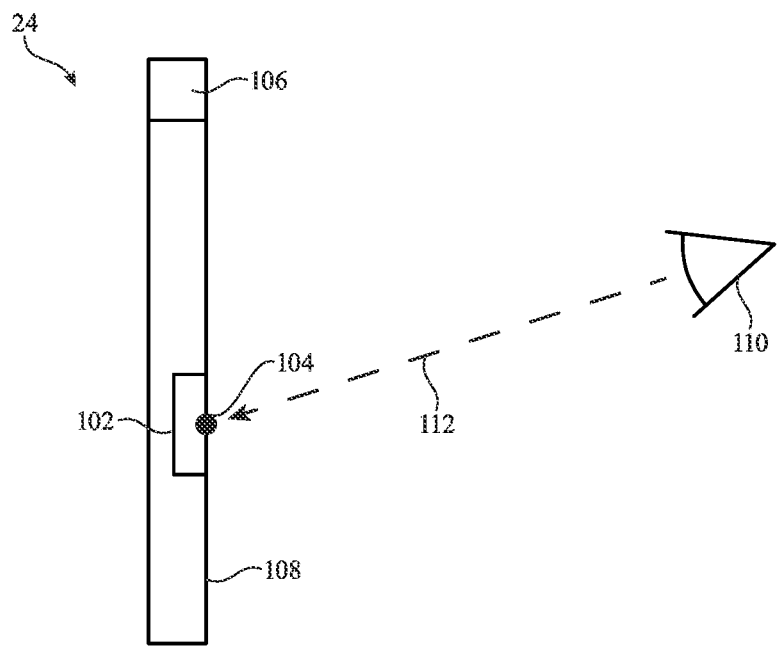
FIG. 10 is a side view of an illustrative system having a computer with a computer housing in which a display is mounted or other equipment with a display and having a gaze tracker in accordance with an embodiment.

Consider, as an example, a scenario of the type shown in FIG. 10. In this example, device 24 has a housing in which gaze tracker 106 has been mounted for monitoring a user's eyes 110. Device 24 may include a display such as display 108. Display 108 may be configured to display images for the user. The image may include one or more objects (e.g., visual items) such as object 102. Control circuitry in device 24 may use gaze tracker 106 to determine the direction 112 in which the user is viewing display 108 or other object. Using direction 112 and/or other information from gaze tracker 106 and/or other sensors (e.g., a depth sensor and/or other sensors that determine the distance of the user from device 24), device 24 may determine the location of the user's point-of-gaze 104 on display 108. For example, device 24 can determine whether a virtual object such as object 102 on display 108 is currently being viewed by the user.

Figure 11:
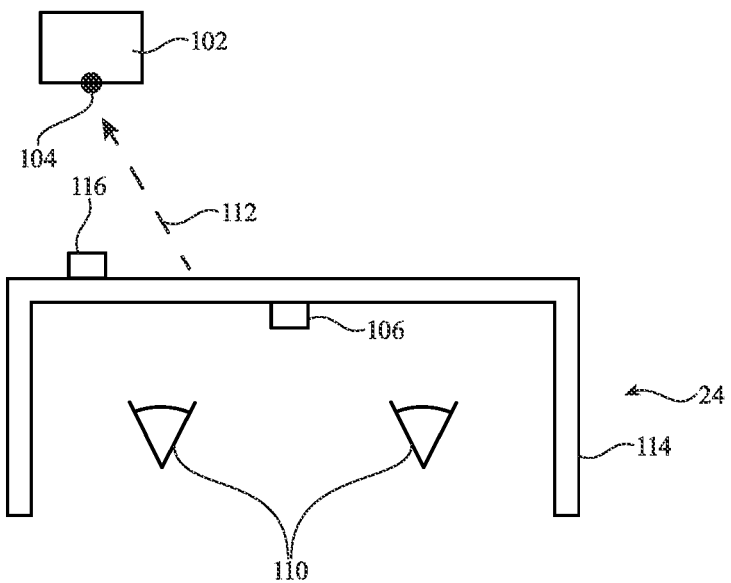
FIG. 11 is a top view of an illustrative head-mounted device having support structures configured to support a display and sensors such as a gaze tracker and forward facing camera in accordance with an embodiment.

Another illustrative system with gaze tracking is shown in FIG. 11. In the example of FIG. 11, device 24 is a head-mounted device having a head-mounted support structure 114 (sometimes referred to as a housing) that is configured to be worn on the head of a user. Rear facing gaze tracking system 106 may monitor user's eyes 110 to determine the direction 112 of the user's gaze. Additional sensors (e.g. depth sensor 116) may be used in determining the location and/or other attributes of objects in the user's field of view such as object 102 of FIG. 11. Object 102 may be a real-world object (e.g., a table surface, an inanimate object with circuitry such as one or more devices 24, a non-electronic inanimate object such as a pencil, ball, bottle, cup, table, wall, etc.) or may be a computer-generated (virtual) object that is being presented to the user's eyes 110 by a display in device 24 (e.g., a see-through display system or a display system in which virtual content is overlaid on real-world images on the display that have been captured with camera 116). Using information on the direction 112 of the user's gaze and information on the relative position between the user and object 102 (e.g., information from a depth sensor in device 24 and/or information on virtual objects being presented to the user), device 24 may determine when the user's point-of-gaze 104 coincides with object 102.

Arrangements of the type shown in FIGS. 10 and 11 allow a user to interact with real-world content and computer-generated (virtual) content. For example, a user may select an object of interest by directing point-of-gaze 104 towards that object (e.g., for more than a predetermined dwell time and/or until associated user input such as finger input is received to confirm selection). Using device(s) 10 and/or other equipment in system 8, the user may perform operations on the selected object. For example, an object that is selected by a lingering point-of-gaze or other selection action may be manipulated using two-dimensional touch input gathered using touch sensor 42, using force input gathered using sensor 52, using tap input gathered by an accelerometer in device 10, using motion input gathered by motion sensor 98 and/or position tracking circuitry such as camera 92, camera 94, and/or visual markers 86, or using other input gathered using other sensors 18. Examples of virtual object manipulations that may be performed based on two-dimensional touch input and/or other sensor input include object translations, rotations, resizing operations, alterations of other visual properties such as colors, textures, brightness levels, and/or contrast settings, etc.

Real-world objects can also be manipulated. These objects may include, for example, real-world devices such as electronic systems in a home or office, electronic devices such as portable electronic devices, and/or other electronic equipment, computers, home automation systems, lighting, heating and ventilation systems, window blinds, door locks, security cameras, thermostats, audio systems, audio-visual equipment such as televisions, set-top boxes, voice assistant speakers, and/or other electronic equipment (e.g., devices including components such as the circuitry of devices 24). Examples of real-life object manipulations that may be performed on a selected object include adjusting the brightness of a lightbulb (part of a wireless lighting system), adjusting the temperature of a thermostat, adjusting the operation of a computer, adjusting a television (e.g., changing channels, adjusting volume, changing video and/or audio sources, selecting tracks and video clips to play, etc.), adjusting speaker volume, skipping tracks, etc.

If desired, objects may be selected by detecting when device 10 is pointing at an object of interest (e.g., by tracking the location of objects and/or device 10 using a camera in device 24 or device 10 and by determining the orientation and pointing direction of device 10 using an inertial measurement unit or other orientation sensor in device 10 and/or by using radio-frequency sensors and/or using the camera to track the location and orientation of device 10 using optical tracking elements on device 10). Relative position determination and object selection may be performed using radio-frequency sensors (e.g., IEEE ultrawideband sensors) for detecting the orientation and location of device 10 and determining the range of an object, etc. and/or using other sensors 18.

Consider, as a first example, a scenario in which object 102 is a computer-generated icon. In this situation, after aligning point-of-gaze 104 to overlap the computer-generated icon and thereby select the icon for further action, a user may supply a command with controller 10 and/or other input components in system 8 that direct system 8 to commence an associated operation in system 8. If, as an example, the icon is an email icon, system 8 may, upon receipt of user input to device 10, launch an email program on device 24.

In a second example, object 102 is a real-world object such as a non-electronic inanimate object (e.g., an object being viewed by the user of device 24 of FIG. 11 while device 24 is being worn on the head of the user). In response to detecting that the user's point-of-gaze 104 is directed at object 102 and in response to receipt of input to controller 10, device 24 may generate a virtual object that overlaps all or part of object 102 in the user's field of view. Other operations may include, magnifying part of object 102, changing the color or texture of object 102, adding an outline around object 102, adding graphical elements that are aligned with object 102, and/or taking other suitable actions.

In a third example, object 102 is a real-world object that includes circuitry. Object 102 may be, for example, a wireless speaker or other electronic device 24. In response to detecting that the user's point-of-gaze 104 is directed at object 102 and in response to receipt of user input to device 10, device 24 may adjust the output volume of the speaker. If the object that coincides with point-of-gaze 104 is a device such as a television, the channel of the television may be changed in response to the user input to device 10. In this way, a user can interact with electronic devices around the user's home or office or electronic devices in other environments simply by gazing at the objects and supplying additional input to device 10 in coordination with this point-of-gaze selection. Point-of-gaze dwell time, eye blinks, and other eye activity may also be used as a user input.

Figure 12:
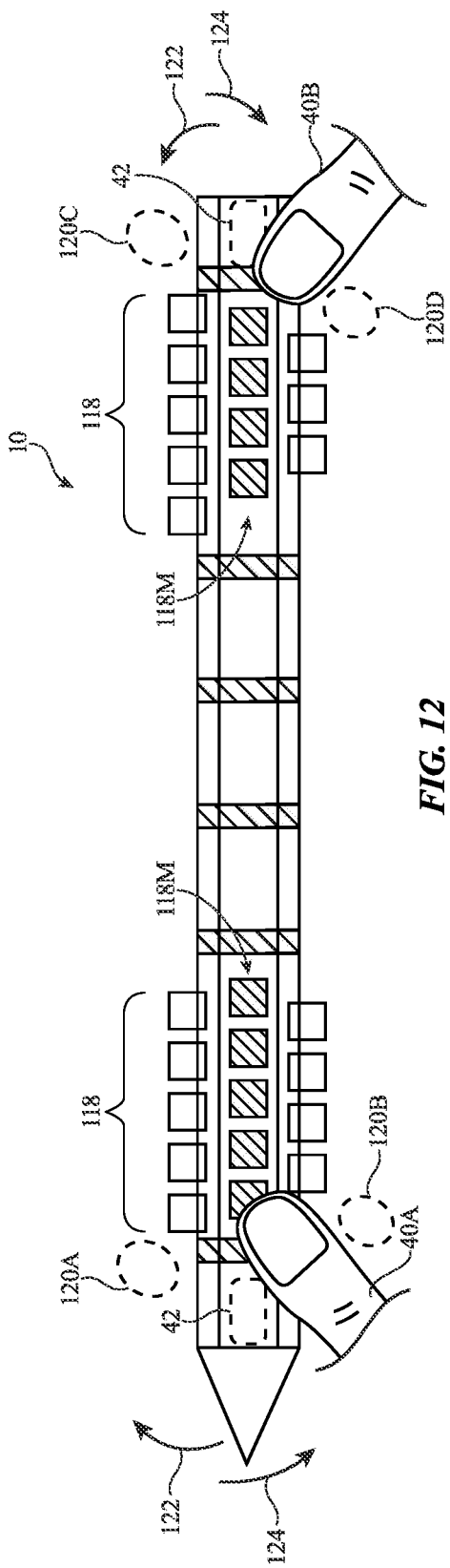
FIG. 12 is a side view of an illustrative handheld controller onto which computer-generated display content is overlaid in accordance with an embodiment.

If desired, device 24 may be used to overlay computer-generated content onto or near device 10. As shown in FIG. 12, for example, a user may wear head-mounted device 24 while holding device 10. The head-mounted device may overlay computer-generated display content such as display content 118 onto device 10. Display content 118 may, for example, include an array of virtual keyboard keys. The user may select keys by providing touch input, force input, motion input, or other user input to device 10 in a position that overlaps with the virtual keyboard key being selected. For example, as shown in FIG. 12, some of the display content such as display content 118M may overlap device 10. The user may then select keyboard keys from display content 118M by tapping, hovering, gazing, or providing other user input to the desired virtual key within the row of display content 118M. If desired, the user may apply touch or force input to touch sensors 42 to select or manipulate display content 118 (e.g., to act as a shift key). To scroll to a different row so that a different set of keys are overlapping device 10, the user may rotate device 10 in directions 122 and 124, which may cause display content 118 to move based on the direction of rotation of device 10. If desired, sensors in device 10 and/or a camera in device 24 may track where the user's fingers are relative to device 10 and display content 118 may be manipulated accordingly. For example, if finger 40B hovers in location 120C, a key in the top row may be selected, or the top row of keys in display content 118 may be moved downward to overlap device 10 so that the user can select one of the keys from that row by touching or tapping device 10. If finger 40A hovers in location 120B, a key in the bottom row may be selected, or the bottom row of virtual keys in display content 118 may be moved upward to overlap device 10 so that the user can select one of the keys from that row by touching or tapping device 10. Camera 92 of device 24 and/or sensors 18 in device 10 may be used to monitor finger locations (e.g., locations 120A, 120B, 120C, 120D, etc.) relative to device 10 so that appropriate action can be taken with respect to display content 118.

Figure 13:
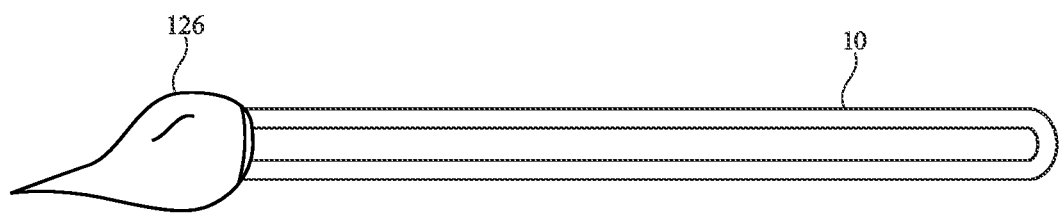
FIG. 13 is a side view of an illustrative handheld controller having a tip portion onto which a computer-generated paint brush head is overlaid in accordance with an embodiment.
Figure 14:
FIG. 14 is a side view of an illustrative handheld controller having a tip portion onto which a computer-generated tool head is overlaid in accordance with an embodiment.

If desired, display content may be overlaid onto device 10 to indicate what type of input functions device 10 is providing to external equipment such as device 24. For example, if device 10 is being used to provide virtual painting input while a display in device 24 displays what the user is painting, the display of device 24 may overlay a paintbrush head 126 onto the tip of device 10, as shown in FIG. 13. If device 10 is being used to provide virtual sculpting input while a display in device 24 displays what the user is sculpting, the display of device 24 may overlay a sculpting tool 128 onto the tip of device 10, as shown in FIG. 14. These examples are merely illustrative. Other computer-generated display content such as other writing implements, steering wheels, buttons, knobs, wands, and/or any other suitable virtual content may be overlaid onto device 10 while using device 10 to provide input to an external device such as device 24.

Figure 15:
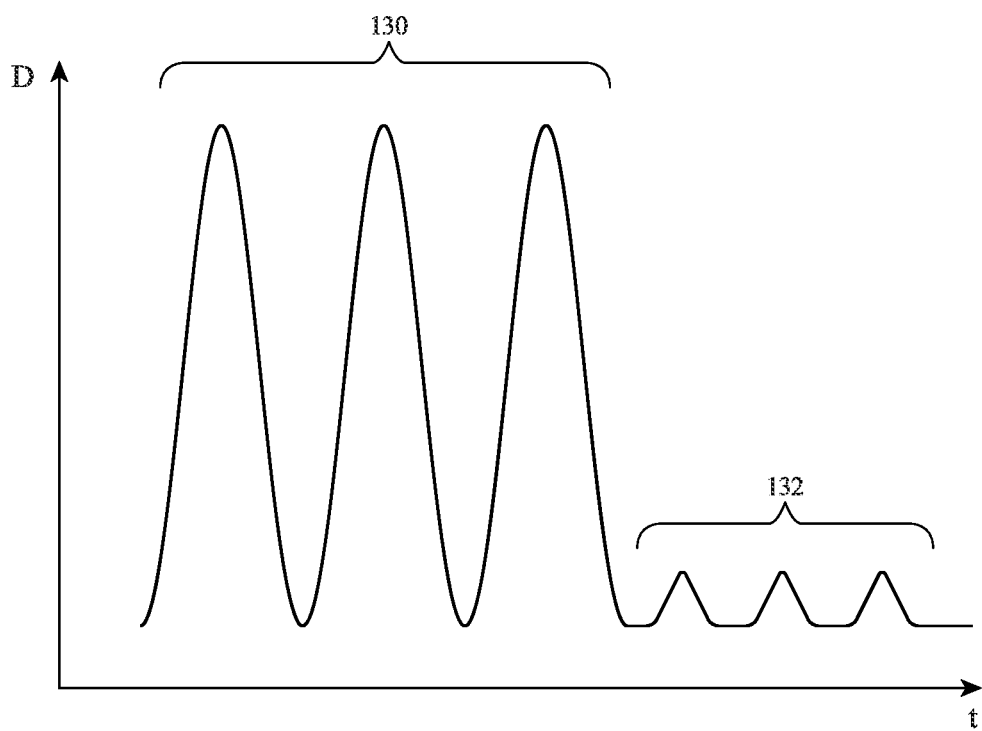
FIG. 15 is a graph showing illustrative haptic output signals that may be produced to provide a user with different textures when interacting with a handheld controller in accordance with an embodiment.

If desired, device 10 may provide haptic output while device 10 is being used to control external equipment. For example, while a user is "writing" with device 10 by moving the tip of device 10 across a surface, haptic output may be provided based on the texture of the surface being written on and/or based on the writing implement that is currently selected for device 10. If desired, different surfaces and/or different input modes for device 10 may result in different haptic output. FIG. 15 is a graph showing an illustrative drive signal D that has been plotted as a function of time t. As an example, control circuitry in device 10 can supply a first drive signal D with a relatively high amplitude and frequency during time 130 when device 10 is being used in a pen input mode (e.g., in which device 10 is used to create pen-style writing on an external display). When device 10 switches into a different mode such as a gaming mode (e.g., in which device 10 is being used as a tool in a game) during time 132, a different texture or other haptic output can be supplied to the user's hands with the haptic output components 20 in device 10. As an example, during time 132, a lower-frequency and lower-magnitude drive signal D can be used to control the haptic output components in device 10. As a result, the user will feel a first texture or other feedback when using device 10 for a first input function and a second texture or other feedback when using device 10 for a second input function. If desired, other haptic effects such as haptic output that conveys shape and/or rounded edges, effects associated with compliant structures, detents, force-feedback simulating motion resistance, clicks simulating depression and/or release of a button with a physical click sensation, and/or other haptic effects. Corresponding visual effects can be provided from a display of device 24.

Figure 16:
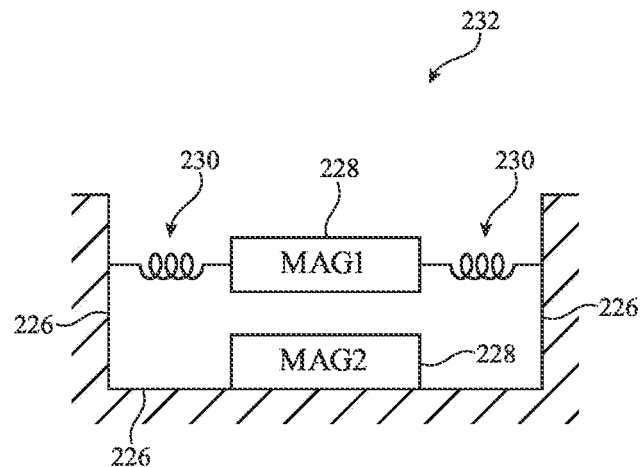
FIG. 16 is a side view of an illustrative haptic output device such as a linear resonant actuator in accordance with an embodiment.

FIG. 16 is a diagram of an illustrative haptic output device such as a linear resonant actuator that may be included in haptic output devices 20 of controller 10. In the example of FIG. 16, linear resonant actuator 232 has magnets 228. Magnets 228 may include permanent magnets and/or electromagnets. Support structures 226 may be formed from metal, polymer, and/or other materials. A first of magnets 228 such as magnet MAG2 (e.g., a permanent magnet) may be attached to support structures 226. A second of magnets 228 such as magnet MAG1 (e.g., an electromagnet) may be coupled to support structures 226 by a mechanical system (see, e.g., springs 230) that allows magnet MAG1 to move relative to magnet MAG2 and that exhibits resonance. Linear resonant actuator 232 may be driven by applying an alternating-current drive signal to an electromagnet in magnets 228 (e.g., magnet MAG2). When driven with a waveform characterized by a frequency at or near the resonant frequency of actuator 232, actuator 232 may exhibit an enhanced vibrations and therefore an enhanced haptic output for the user of device 10. Linear resonant actuator 232 may be mounted in any suitable location of device 10 (e.g., within main body portion B, tip portion T1, tip portion T2, etc.).

Figure 17:
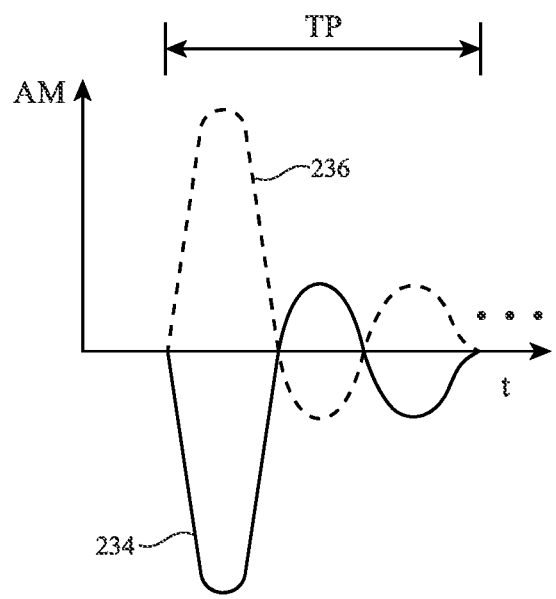
FIG. 17 is a graph of illustrative drive signals for a linear resonant actuator in accordance with an embodiment.

Haptic output devices such as linear resonant actuator 232 may be driven using any suitable drive signals. Illustrative drive signals that may be used are shown in FIG. 17. Drive signal amplitude AM versus time t is plotted for two illustrative drive signals in the graph of FIG. 17. The illustrative drive signals of FIG. 17 may be repeated for multiple periods TP (e.g., at a repetition frequency of 75 Hz, more than 75 Hz, or less than 75 Hz). The total duration over which the drive signal is applied to the linear resonant actuator 232 is equal to the total duration for which haptic output is desired (e.g., at least 0.2 s, at least 0.5 s, at least 1 s, less than 500 s, less than 50 s, less than 5 s, less than 0.8 s, etc.). As shown by illustrative drive waveform 234, within each period TP, linear resonant actuator 232 may be driven by a periodic oscillating waveform that decays over several oscillations. The frequency of the oscillations in this waveform may be selected to coincide with the resonant frequency of the linear resonant actuator.

The asymmetry of the oscillations within each period TP may impart directionality to the haptic effect experienced by the user. For example, waveform 234 may impart a feeling of force on finger 40 in a given direction, whereas waveform 236, which is the complement of waveform 234 may impart a feeling of force on finger 40 in a direction that is opposite to the given direction (as examples). Haptic output with frequency components in the 50-300 Hz range may be well suited for detection by humans (e.g., finger 40), but other frequency components may be present in the drive signal applied to linear resonant actuator 232, if desired. In some arrangements, there may be a tradeoff between directional feel and vibrational feel (i.e., drive signals that are asymmetric or otherwise configured to enhance a user's perception of directional force on finger 40 may tend to reduce the user's perception that finger 40 is vibrating and vice versa). Drive signals such as drive signals 234 and 236 of FIG. 17 may be configured to provide a desired mixture of directional feel and vibrational feel (e.g., by altering the shape of the decay envelope of the drive signal, by altering the oscillation frequency of the drive signal within each period TP, by altering the leading edge slope and/or the trailing edge slope of oscillations in the drive signal, by altering the degree of asymmetry within each oscillation and/or within each period TP, etc.).

As described above, one aspect of the present technology is the gathering and use of information such as sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A handheld controller for controlling an electronic device, comprising:
    a housing having an elongated shaft extending between first and second tip portions;
    a force sensor in the first tip portion configured to gather force input;
    a camera in the first tip portion configured to capture images;
    a motion sensor configured to gather motion data;
    an actuator configured to provide haptic output in response to the force input and the motion data; and
    control circuitry in the housing configured to send control signals to the electronic device based on the force input, the motion data, and the captured images.

2. The handheld controller defined in claim 1 wherein the first tip portion is removable from the elongated shaft.

3. The handheld controller defined in claim 1 wherein the elongated shaft has a flat surface and a curved surface.

4. The handheld controller defined in claim 3 further comprising a button on the flat surface of the elongated shaft.

5. The handheld controller defined in claim 3 further comprising a touch sensor on the curved surface of the elongated shaft.

6. The handheld controller defined in claim 1 further comprising a power receiving coil configured to receive wireless power.

7. The handheld controller defined in claim 1 wherein the actuator comprises a linear resonant actuator that is configured to impart directionality to the haptic output.

8. The handheld controller defined in claim 1 further comprising a scroll wheel that rotates relative to the elongated housing.

9. The handheld controller defined in claim 1 wherein the elongated housing comprises first and second housing portions operable in a first mode in which the first and second housing portions are mated with one another and a second mode in which the first and second housing portions are separated from one another and independently operated.

10. The handheld controller defined in claim 1 wherein the control signals include instructions to select a user interface element on a display in the electronic device.

11. The handheld controller defined in claim 1 wherein the control signals include instructions to draw a line on a display in the electronic device.

12. The handheld controller defined in claim 1 wherein the control signals include instructions to type a word on a display in the electronic device.

13. The handheld controller defined in claim 1 further comprising:
    a touch sensor on the elongated shaft configured to gather touch input.

14. The handheld controller defined in claim 13 wherein the housing has a length between 130 mm and 160 mm and a diameter between 10 mm and 15 mm.

15. The handheld controller defined in claim 13 wherein the camera comprises a one-pixel camera.

16. The handheld controller defined in claim 13 wherein the control signals include instructions to scroll content on a display in the electronic device.

17. A handheld controller for controlling an electronic device, comprising:

a housing having an elongated shaft extending between first and second tip portions;

a force sensor in the first tip portion configured to gather force input;

a motion sensor configured to gather motion data;

an actuator configured to provide haptic output in response to the force input and the motion data;

control circuitry in the housing configured to send control signals to the electronic device based on the force input and the motion data; and visual markers located on the elongated shaft, wherein the visual markers are configured to be captured by a camera in the electronic device and wherein the electronic device tracks a location of the handheld controller relative to the electronic device using the visual markers and the motion data.

18. The handheld controller defined in claim 17 wherein the control signals include instructions to manipulate computer-generated display content on the electronic device.

19. The handheld controller defined in claim 18 wherein the instructions are based on the motion data.

20. The handheld controller defined in claim 19 wherein the instructions to manipulate the computer-generated display content comprise instructions to manipulate content selected from the group consisting of: virtual keyboard keys and a virtual writing implement.

* * * * *